Figure 1:
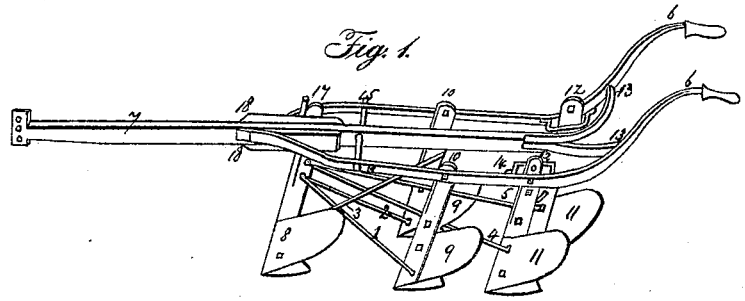
Figure 2:
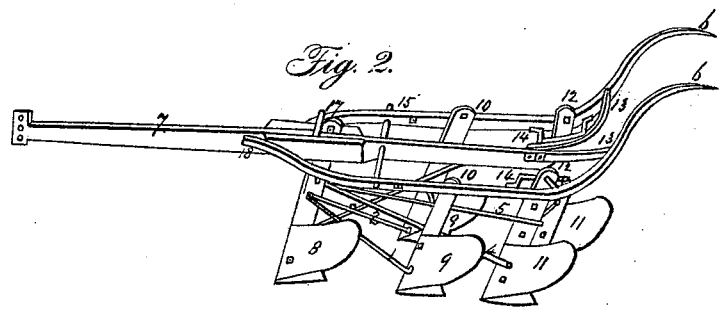
Figure 3:
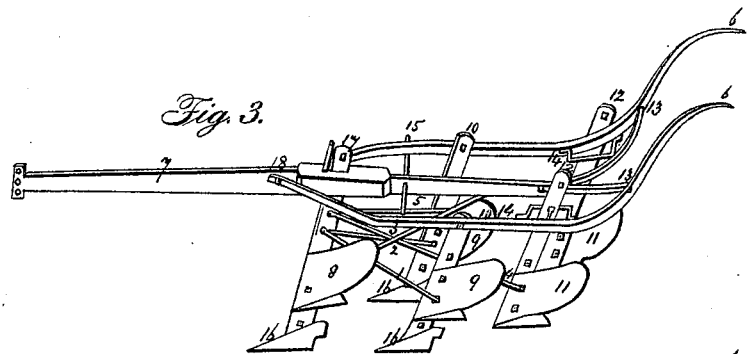
Figure 4:
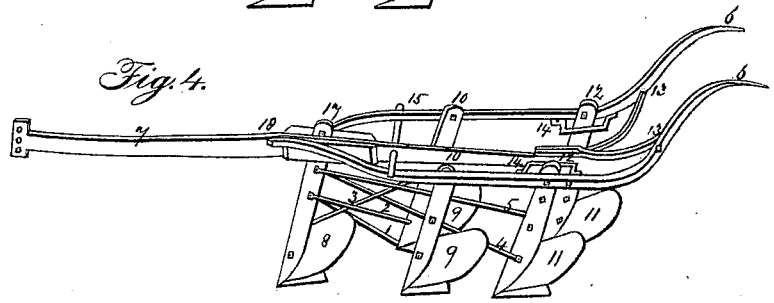

H. BACON.
Subsoil-Plow.

No. 6,508.  Patented June 5. 1849.

UNITED STATES PATENT OFFICE.

HENRY BACON, OF TECUMSEH, MICHIGAN.

IMPROVEMENT IN SUBSOIL CORN-PLOWS.

Specification forming part of Letters Patent No. 6,508, dated June 5, 1849.

*To all whom it may concern:*

Be it known that I, HENRY BACON, of Tecumseh, in the county of Lenawee and State of Michigan, have invented a new and useful farming implement for cultivating corn and root crops and putting in wheat among corn, which I call the "Subsoil-Cultivator Corn-Plow;" and I do hereby declare that the following is a full, clear, and exact description of the construction and operation of the same, reference being had to the annexed drawings, making a part of this specification.

I generally construct them of iron and shell—cast or wrought—with the exception of two small pieces of wood turned and fitted to the ends of the iron handles 6 6, fastened on with a nut and screw, as is represented in the drawing No. 1. The beam and handles, however, may be made of wood, but are not deemed as durable or good, nor as cheap in the end. It consists of a beam, 7, two handles, 6 6, five standards, and five braces, 1 2 3 4 5, attached to the standards, on which are prefixed five small plows, 8 9 9 11 11, and fastened by means of screws passing through the side of their mold-board into the standards and screwed fast, with their heads countersunk into the mold-board, with a plurality of holes made in the standards, all of the holes of the same size to admit these screws. By this means these five small plows can be raised or lowered on their standards, as business may require. The beam 7 to be cast similar in shape to that shown in the drawings, of malleable or other iron, or wrought of a suitable length, breadth, and thickness.

The handles 6 6 can be cast of malleable iron in shape and form as they are shown in the drawings, or wrought from light one-horse-wagon tire. The two braces 13 13, that connect the handles with the hind end of the beam, secured by nuts and screws, are calculated to be made of common rolled iron one and one-fourth inch wide, one-eighth of an inch thick. Likewise the two clasps 14 14, that secure the two hind standards, 12 12, to the handles secured by nuts and screws, are of the same size.

The handles are attached and secured to the beam by means of a screw-bolt, 18, passing through the forward end of the handles and the beam, and made fast with a nut. Likewise is secured by a bolt, 15, that passes through the beam and handles, and secured on each end by a nut. The forward standard, 17, passes through the beam, and is secured by a bolt and key on the top of the beam; is also braced with an iron brace, 3, one end let into the beam and the other into the standard 17. The two standards 10 10 are secured to the handles with nuts and screws, and secured in their position by two braces, 1 and 2, which are made fast to the forward standard, 17, with a screw-bolt and nut, and to the standards 10 10 in the same manner, and with a horizontal brace-bolt passing from one to the other, which keeps them firm in their position, secured at each end between a nut and shoulder, standards 12 12 being placed in the rear of 10 10, eight inches nearer together in a diagonal form, to prevent them from clogging, each one carried in toward the beam four inches from the handles and secured there on their end on two short bolts extending from the handles and passing through each standard and clasp 14 14, fastened with nuts, and both secured to the handles with nuts and screws, which hold them fast in their position and braced in the same form as standards 10 10.

The standards are quarteringly fitted on their sides to permit the plows to sit in a right position when screwed on. The small plows 8 9 9 11 11 can be cast-iron or wrought. Still they are designed to be made of spring-steel about one-fourth of an inch thick, fitted and formed in a die calculated for that purpose. These small plows are calculated to represent eight inches in height and to cut furrows four inches wide, except the forward one, which is a double plow and throws a furrow four inches each way. Each of these plows consists of a straight front edge, a point, share, and mold-board. The plow is formed of one piece of metal, standing inclined forward. However, they can be made to stand perpendicular and do as good business.

In Figure No. 1 of the plow it is calculated to represent a plow about six feet from the forward end of the beam to the extremity of the handles and sixteen inches wide between standards 10 10, eight inches between standards 12 12, and fourteen inches from standard 17 to standards 10 10, and ten inches from standard 10 on the left to standard 12 on the same side, and sixteen inches from standard 10 on the right to standard 12 on the same side, measuring from standard 17 to standard 12 on the right thirty inches, and when standing on their shares they are sixteen inches high to the top of the beam. They are on a level in all their changes. In Fig. No. 1 the plow is ca'culated to be in the right position for cultivating corn, when young, for the first time. The plows that are attached to standards 10 10 are the ones that run nearest the corn-hills. These standards and shares having been reversed, they turn their furrows from the corn-hills, as is shown at 9 9, and the plows 11 11 turn these furrows, with more earth with them, back again, worked over twice. In Fig. No 2 the standards and plows 9 9 and 10 10 are brought back to their former stations, and all the shares turn their furrows toward the corn-hills 10 10, being set the widest apart, of course throw their furrows nearest the corn-hills 12 12, being located in the rear of 10 10 eight inches nearer together, catch the double furrow of 17 together with their own furrows, and backs up the furrows of 10 10, which furrows form the outer edge of the corn-hills and leave the hill on all sides dishing to the center.

No. 3 is a perspective view of the subsoil-cultivator corn-plow. The plows 8 and 9 9 have been raised on their standards and 11 11 have been raised with their standards, and subsoil-shares have been prefixed to the lower ends of standards 17 and 10 10 by their passing through the subsoil-shares 16 16 16 in form of an oblong square, and made fast with a nut screwed on the ends of the standards, a double subsoil prefixed to standard 17. They are to be cast of iron, similar in shape to those shown in the drawings, the double subsoil to be cast about six inches wide and some eight or ten inches long, and the two others about three inches wide and six or eight long in form, as above mentioned.

The plows can be raised or lowered on their standards, so as to throw the quantity of earth designed to be thrown to the corn-hill—say four inches—and you wish to stir the earth some five inches below that. Your subsoil, being two inches thick, will leave a free passage of three inches for the ground to pass through between the subsoil and the other shares.

No. 4 is another modification of the cultivator corn-plow. These small plows are to be made similar in shape to those in the drawings. The front piece serves as a standard and a colter, to which the nose or point of the share, together with the share and moldboard, are all connected in one piece, which forms the plow. These plows 8 9 9 and 11 11 are designed from the bottom of their shares to the top of their standard or front piece, where they are made fast by nuts and screws to the handles 6 6, sixteen inches—the same height of the cultivator corn-plow, which is a height that can be easily guided among stumps or stones on rough or smooth ground, &c. These plows are five in number, the front one, 8, is to be double and the others single. The pitch of the plow can be regulated by the holes in the fore end of the beam to run deep or shallow, through which the screw-bolt of the clevis, block, and hook passes, which can be raised or lowered as necessity may require.

What I claim as my invention, and desire to secure by Letters Patent, is—

The construction of my subsoil-plowshares, in combination with the small plows fastened above them on the same standards, and having a space between them, in the manner and for the purpose represented and described.

HENRY BACON.

Witnesses:
WILLIAM W. BASS,
CHARLES HEWITT.